March 8, 1960 R. N. SAXBY 2,927,677

TYPE-PRINTING ARRANGEMENTS

Filed April 8, 1957 14 Sheets-Sheet 1

INVENTOR
R. N. Saxby

BY Irwin S. Thompson

ATTORNEY

March 8, 1960 R. N. SAXBY 2,927,677

TYPE-PRINTING ARRANGEMENTS

Filed April 8, 1957

14 Sheets-Sheet 2

INVENTOR
R. N. Saxby

BY Irvin S. Thompson
ATTORNEY

March 8, 1960 R. N. SAXBY 2,927,677

TYPE-PRINTING ARRANGEMENTS

Filed April 8, 1957

14 Sheets-Sheet 3

INVENTOR
R. N. Saxby

BY Irvin S. Thompson

ATTORNEY

March 8, 1960 R. N. SAXBY 2,927,677

TYPE-PRINTING ARRANGEMENTS

Filed April 8, 1957 14 Sheets-Sheet 4

INVENTOR
R. N. Saxby

BY Irvin S. Thompson

ATTORNEY

INVENTOR
R. N. Saxby
BY Irvin S. Thompson
ATTORNEY

March 8, 1960 R. N. SAXBY 2,927,677

TYPE-PRINTING ARRANGEMENTS

Filed April 8, 1957

14 Sheets-Sheet 6

INVENTOR
R. N. Saxby

BY Irwin S. Thompson
ATTORNEY

March 8, 1960 R. N. SAXBY 2,927,677
TYPE-PRINTING ARRANGEMENTS
Filed April 8, 1957
14 Sheets-Sheet 7

INVENTOR
R. N. Saxby
BY Irwin S. Thompson
ATTORNEY

March 8, 1960 R. N. SAXBY 2,927,677

TYPE-PRINTING ARRANGEMENTS

Filed April 8, 1957 14 Sheets-Sheet 8

INVENTOR
R. N. Saxby

BY Irvin S. Thompson

ATTORNEY

March 8, 1960 R. N. SAXBY 2,927,677

TYPE-PRINTING ARRANGEMENTS

Filed April 8, 1957

14 Sheets-Sheet 9

INVENTOR
R. N. Saxby
BY Irwin S. Thompson
ATTORNEY

March 8, 1960 R. N. SAXBY 2,927,677

TYPE-PRINTING ARRANGEMENTS

Filed April 8, 1957 14 Sheets-Sheet 10

INVENTOR
R. N. Saxby

BY Irwin S. Thompson
ATTORNEY

March 8, 1960 R. N. SAXBY 2,927,677

TYPE-PRINTING ARRANGEMENTS

Filed April 8, 1957

14 Sheets-Sheet 11

INVENTOR
R. N. Saxby
BY Irwin S. Thompson
ATTORNEY

March 8, 1960 R. N. SAXBY 2,927,677

TYPE-PRINTING ARRANGEMENTS

Filed April 8, 1957

14 Sheets-Sheet 12

INVENTOR
R. N. Saxby

BY Irwin S. Thompson
ATTORNEY

March 8, 1960 R. N. SAXBY 2,927,677

TYPE-PRINTING ARRANGEMENTS

Filed April 8, 1957

14 Sheets-Sheet 13

INVENTOR
R. N. Saxby

BY Irvin S. Thompson

ATTORNEY

March 8, 1960 R. N. SAXBY 2,927,677
TYPE-PRINTING ARRANGEMENTS
Filed April 8, 1957 14 Sheets-Sheet 14
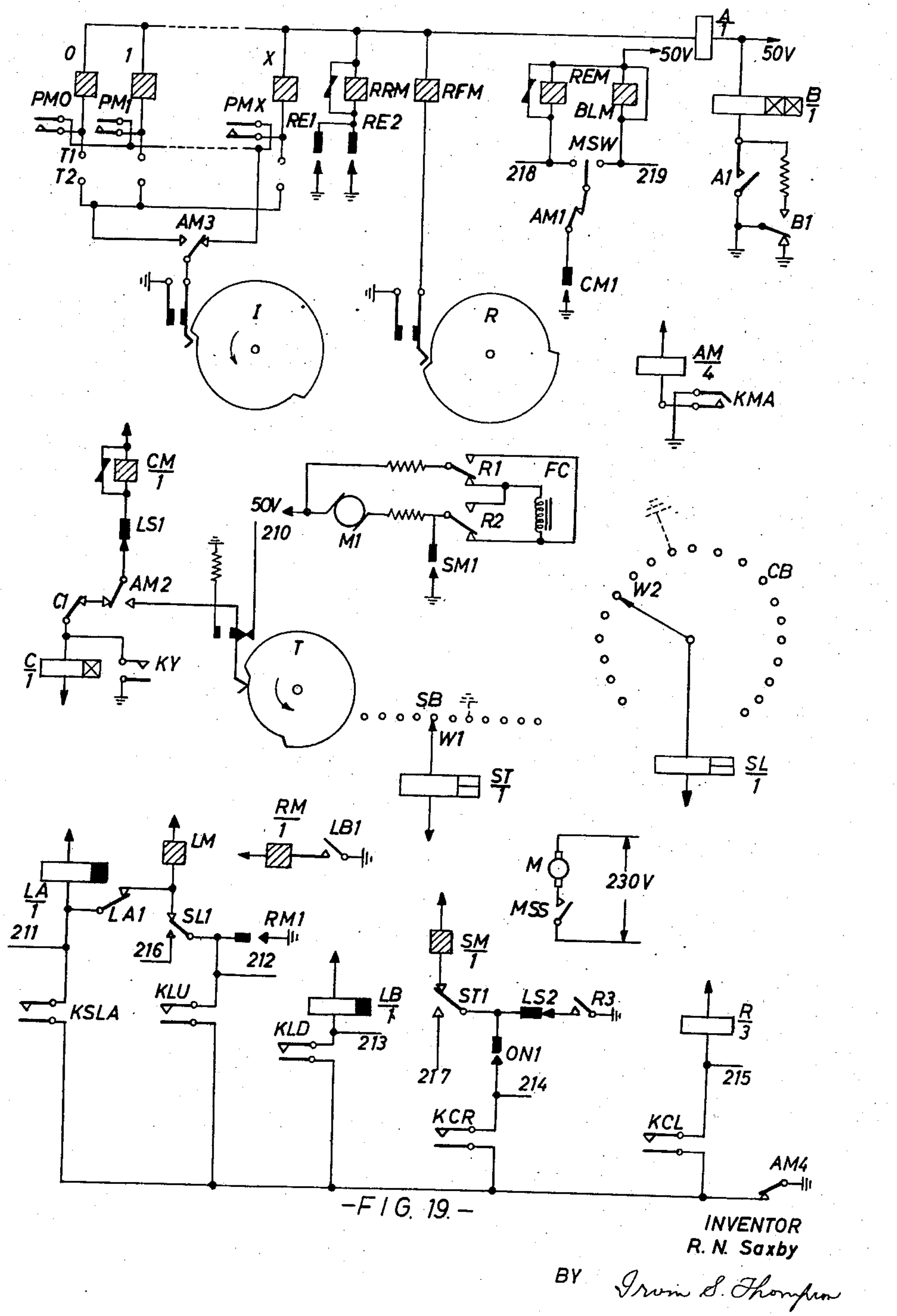
-FIG. 19-
INVENTOR
R. N. Saxby
BY Irvin S. Thompson
ATTORNEY United States Patent Office 2,927,677
Patented Mar. 8, 1960

2,927,677

TYPE-PRINTING ARRANGEMENTS

Robert Norman Saxby, Liverpool, England

Application April 8, 1957, Serial No. 651,286

Claims priority, application Great Britain December 15, 1956

8 Claims. (Cl. 197—13)

Figure 1:
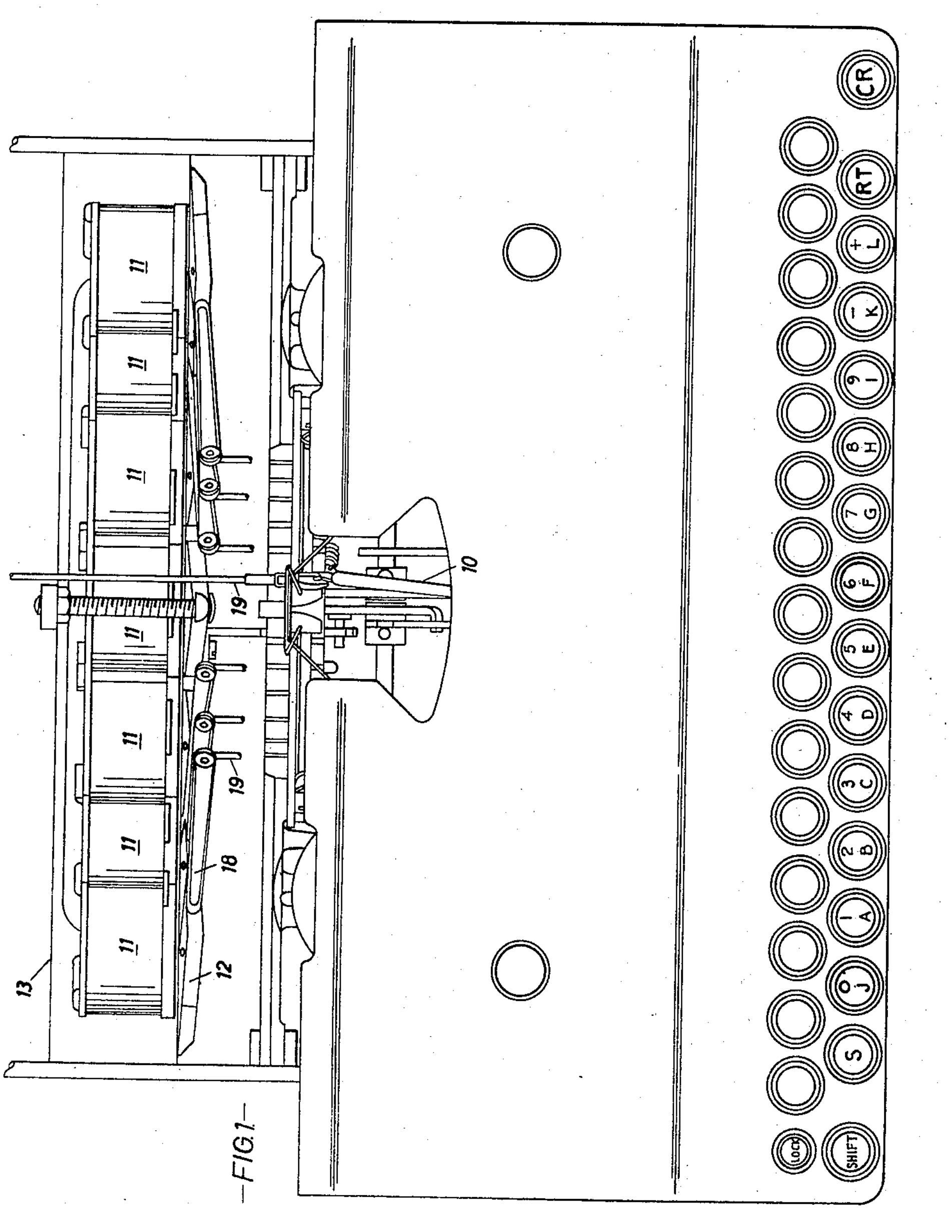

The present invention relates to type-printing mechanisms and is more particularly concerned with such mechanisms which operate at high speeds.

There are many applications at the present time for high speed type-printing mechanisms. For instance, in mechanical or electrical apparatus yielding a series of results which require to be printed, the speed of a complete operation of the apparatus is frequently limited by the speed of the printing mechanism. This is particularly true of high speed computing engines and also applies to some test equipment where, by the use of automatic sequencing arrangements, the results of a number of successive and frequently different tests become available with great rapidity.

One of the objects of the present invention is to provide a type-printing mechanism which will operate at a higher speed than the known types of mechanism and is thus particularly adapted for use in conjunction with high speed computing or test equipment.

Another object of the invention is to provide an improved type-printing mechanism which uses an electric motor drive for controlling its operation.

A further object of the invention is to provide a more positive drive for the carriage of the type printing mechanism.

A still further object of the invention is to provide a mechanism which is compactly constructed from a number of sub-assemblies each readily detachable for maintenance or overhaul.

A further object of the invention is to provide an improved arrangement for operating the type bars of the mechanism under the control of electromagnets and also to provide an improved construction of type bar.

A further object of the invention is to provide a mechanism having an extremely flexible control both of the line feeding arrangements and the carriage control arrangements.

According to one feature of the invention, a continuously-operating electric motor drive is provided and the carriage is advanced in steps by intermittently coupling the drive to a shaft which positively advances the carriage against spring tension.

According to another feature of the invention, a clutch mechanism is controlled to couple the electric motor drive to a shaft to cause the shaft to be rotated to a predetermined extent to control a cycle of operations which enable a character to be printed.

According to a further feature of the invention, a clutch mechanism is controlled to couple the electric motor drive to a shaft to cause the shaft to be rotated in two stages each of a predetermined extent, the first stage of rotation serving to effect the return of the carriage while the second effects the line feed operation.

According to a further feature of the invention, electromagnets are employed for controlling the movement of the type bars to print characters and each type bar is actuated into engagement with the paper on the platen roller directly on the energisation of its associated electromagnet by means of a mechanical linkage between the armature of the electromagnet and the type bar.

According to a further feature of the invention, electrically-operated control means are provided for effecting the movement of the carriage at high speed in both directions and for effecting line feed also in both directions at high speed.

According to a further feature of the invention, the electric motor drive which drives the mechanism through a complete cycle of operations to print a character is also used for controlling line feed in both directions while a separate motor drive which is reversible is employed for effecting carriage control.

Figures 2, 3:
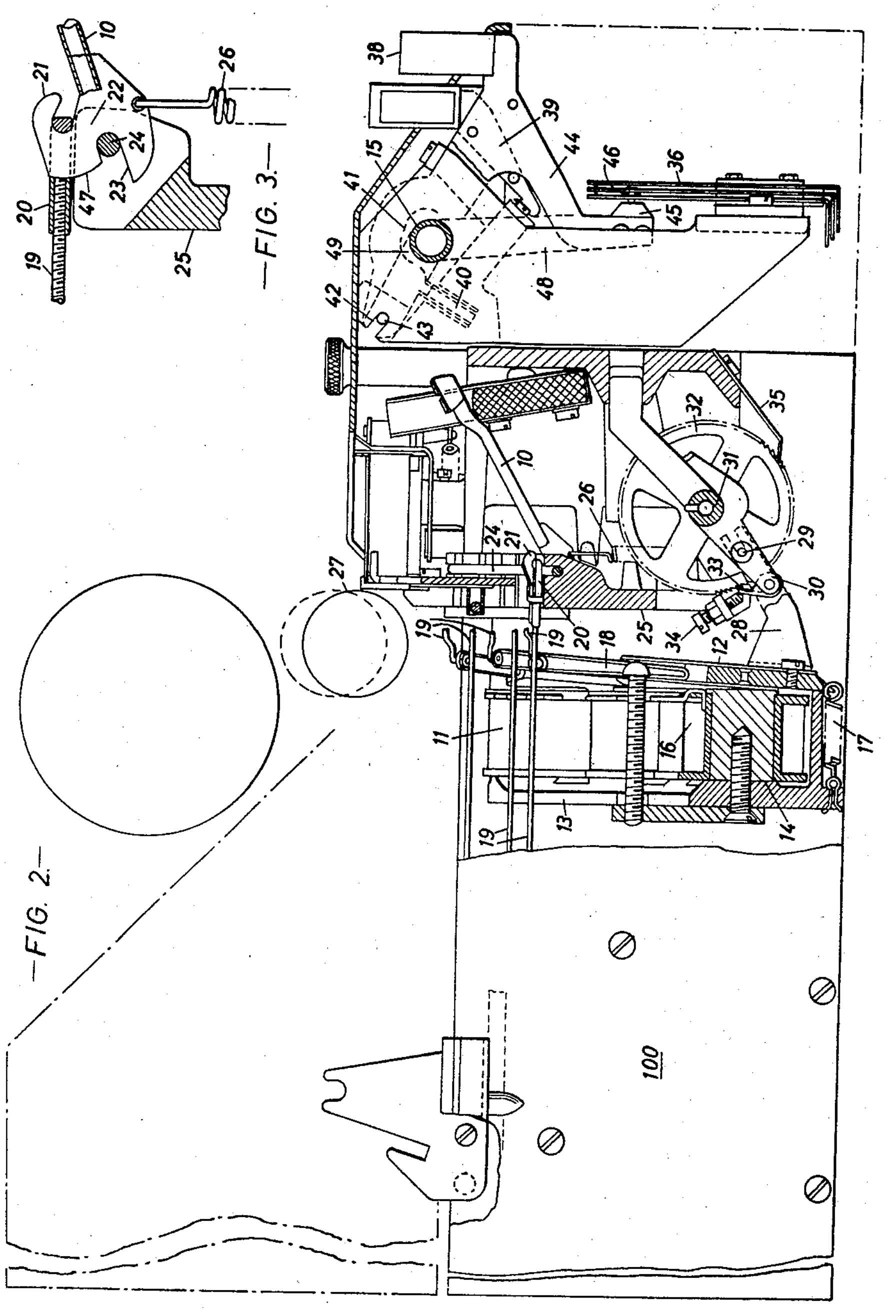
Figure 4:
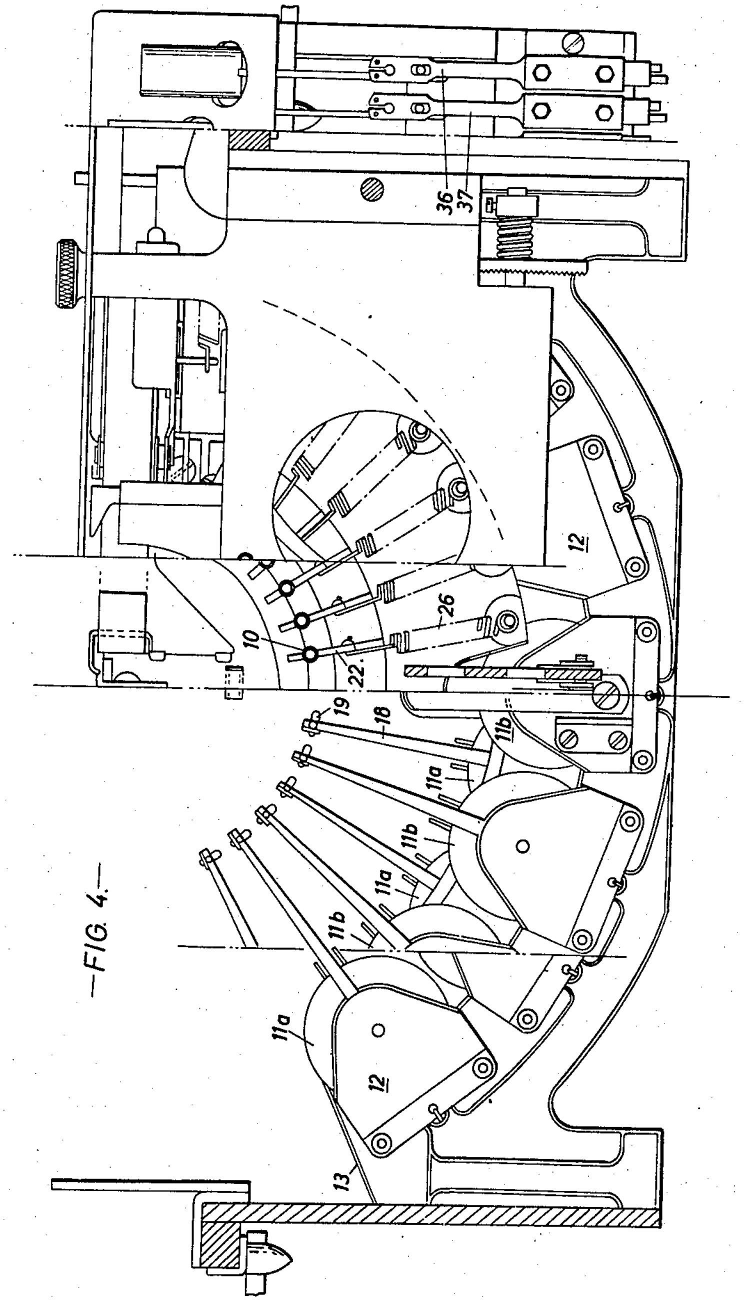
Figure 5:
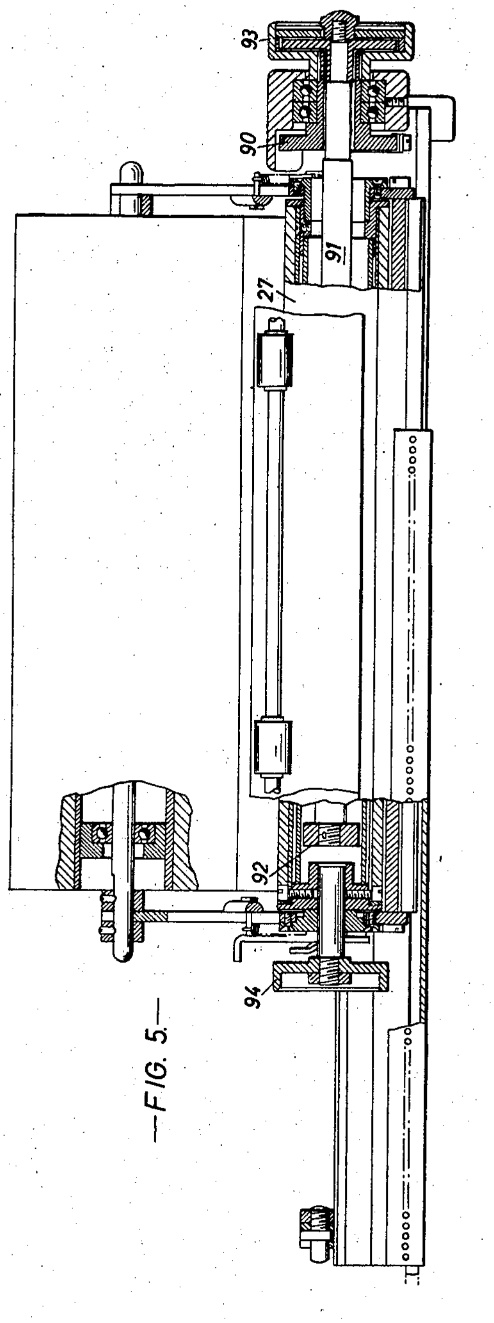
Figure 6:
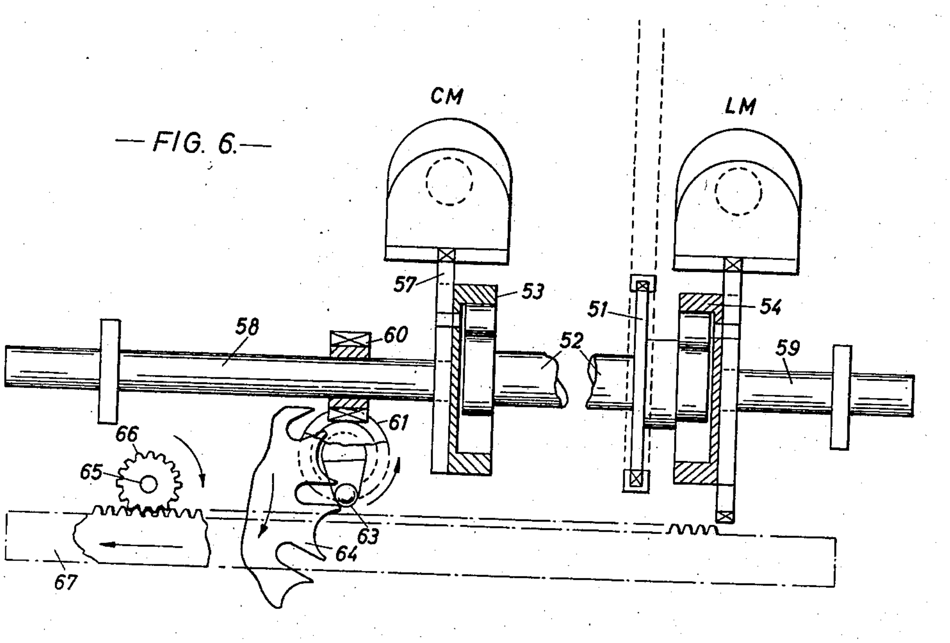
Figure 7:
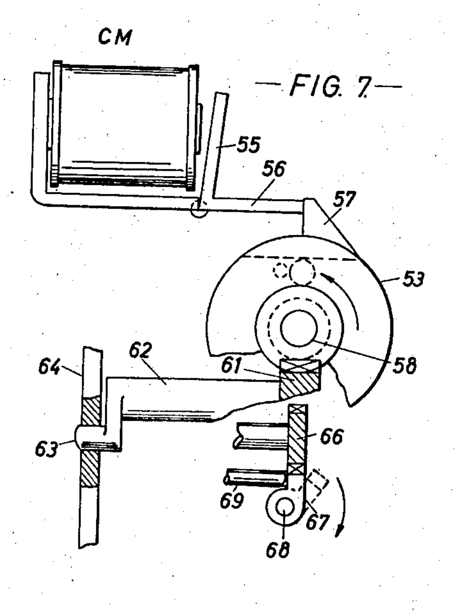
Figure 8:
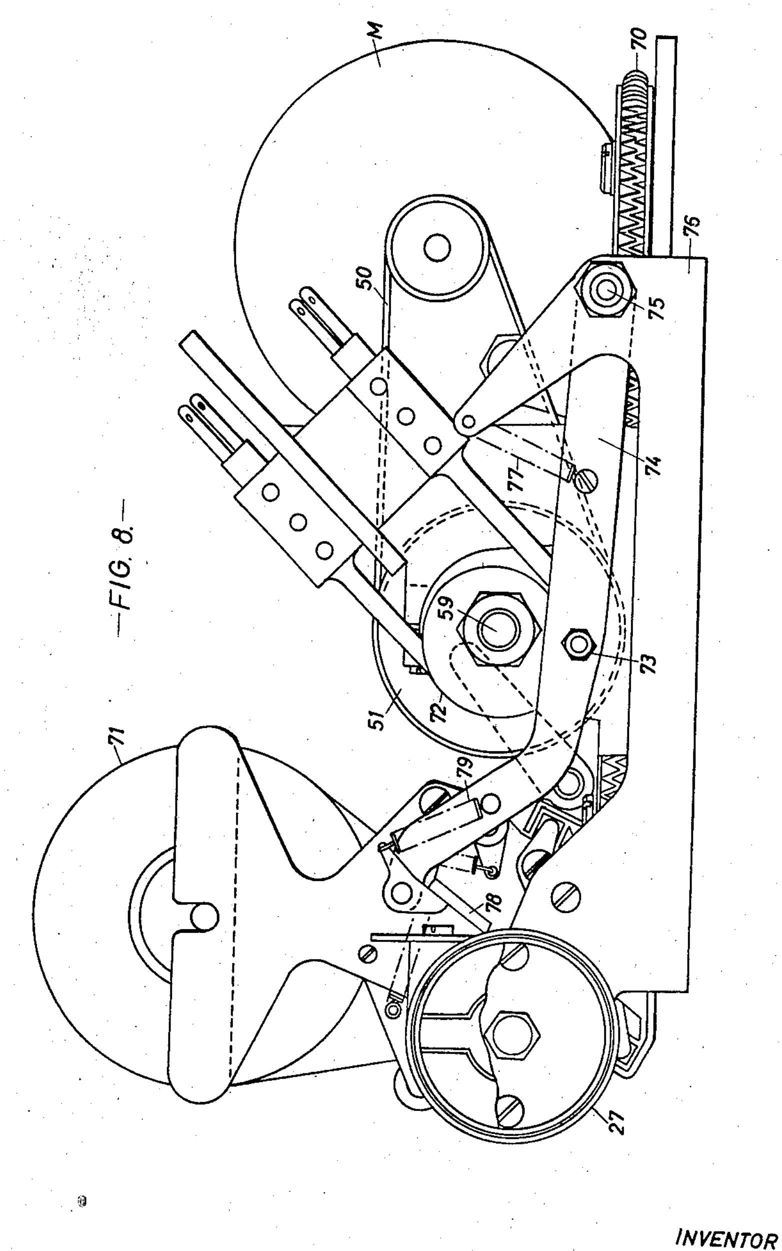
Figure 9:
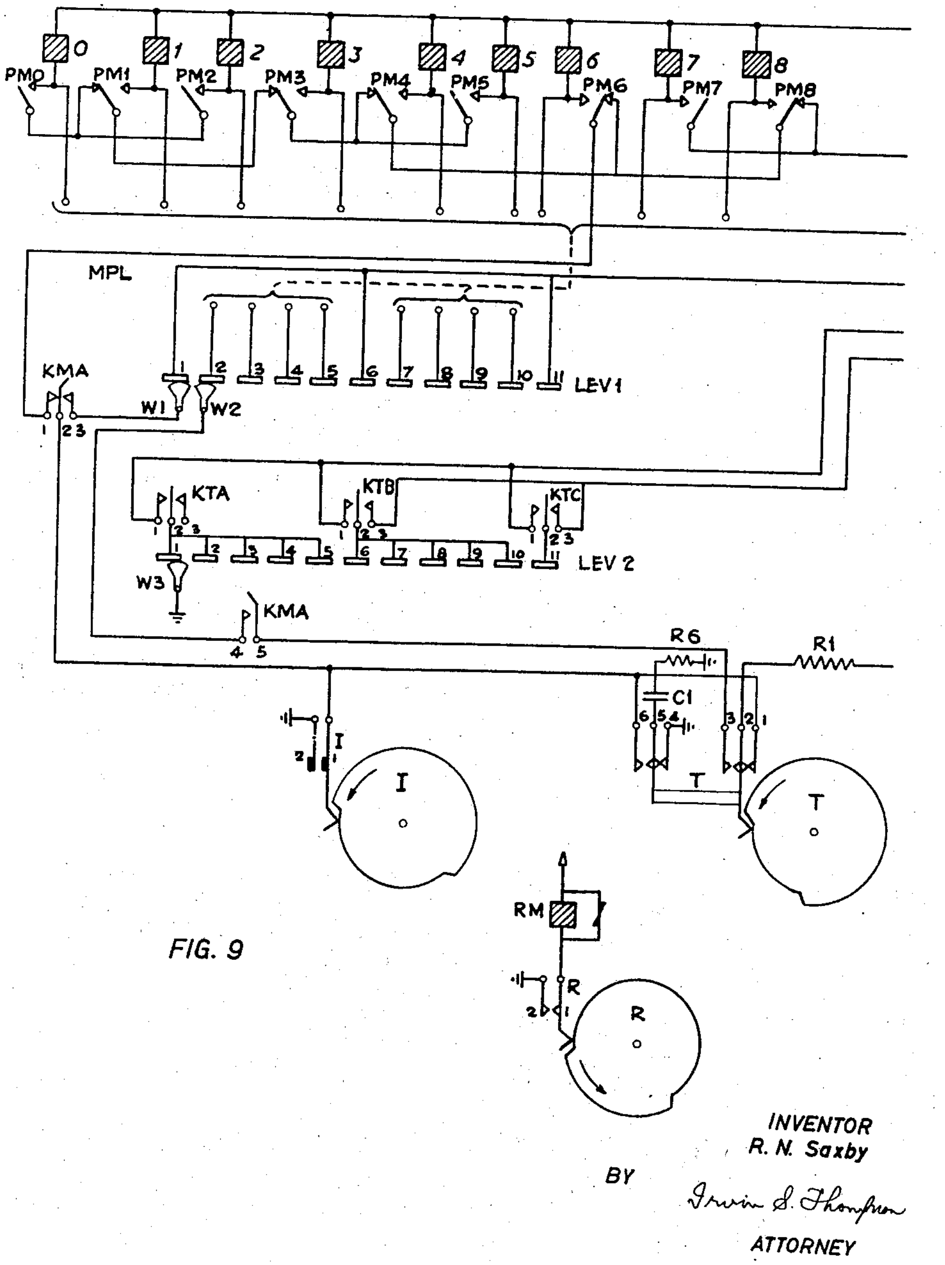
Figure 10:
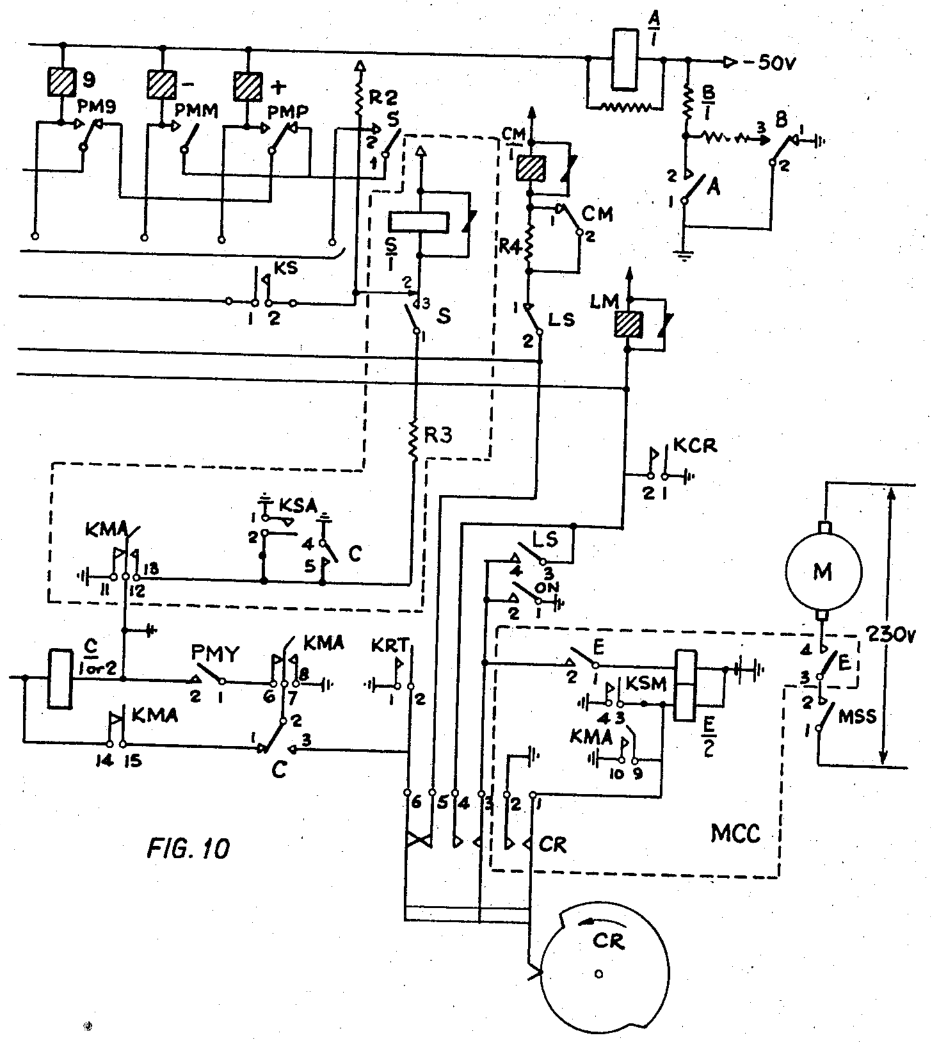
Figures 11, 12:
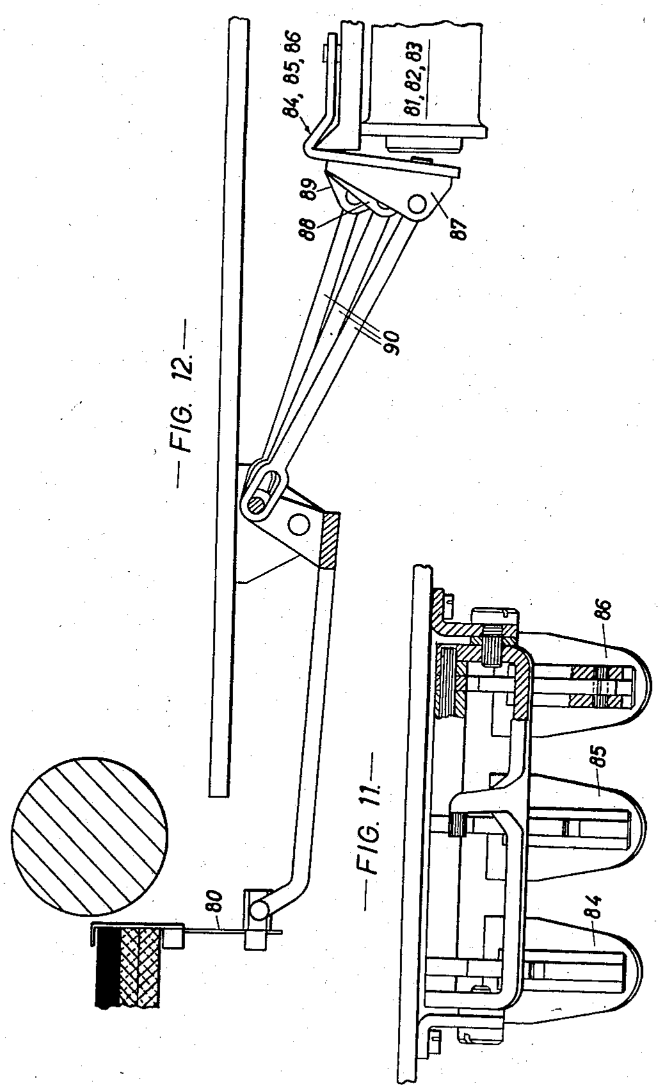
Figure 13:
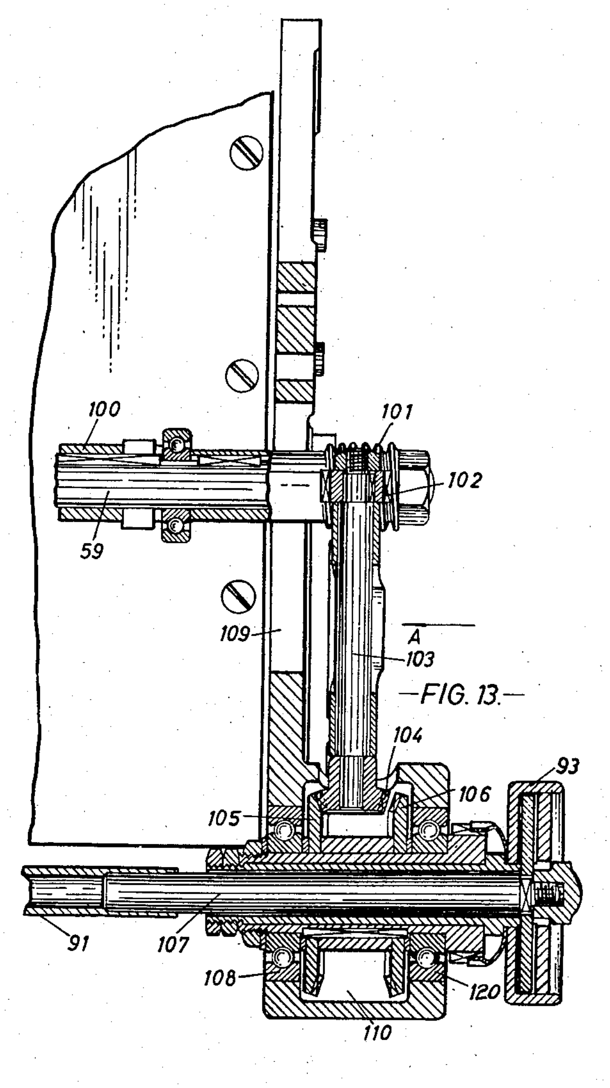
Figures 14, 15:
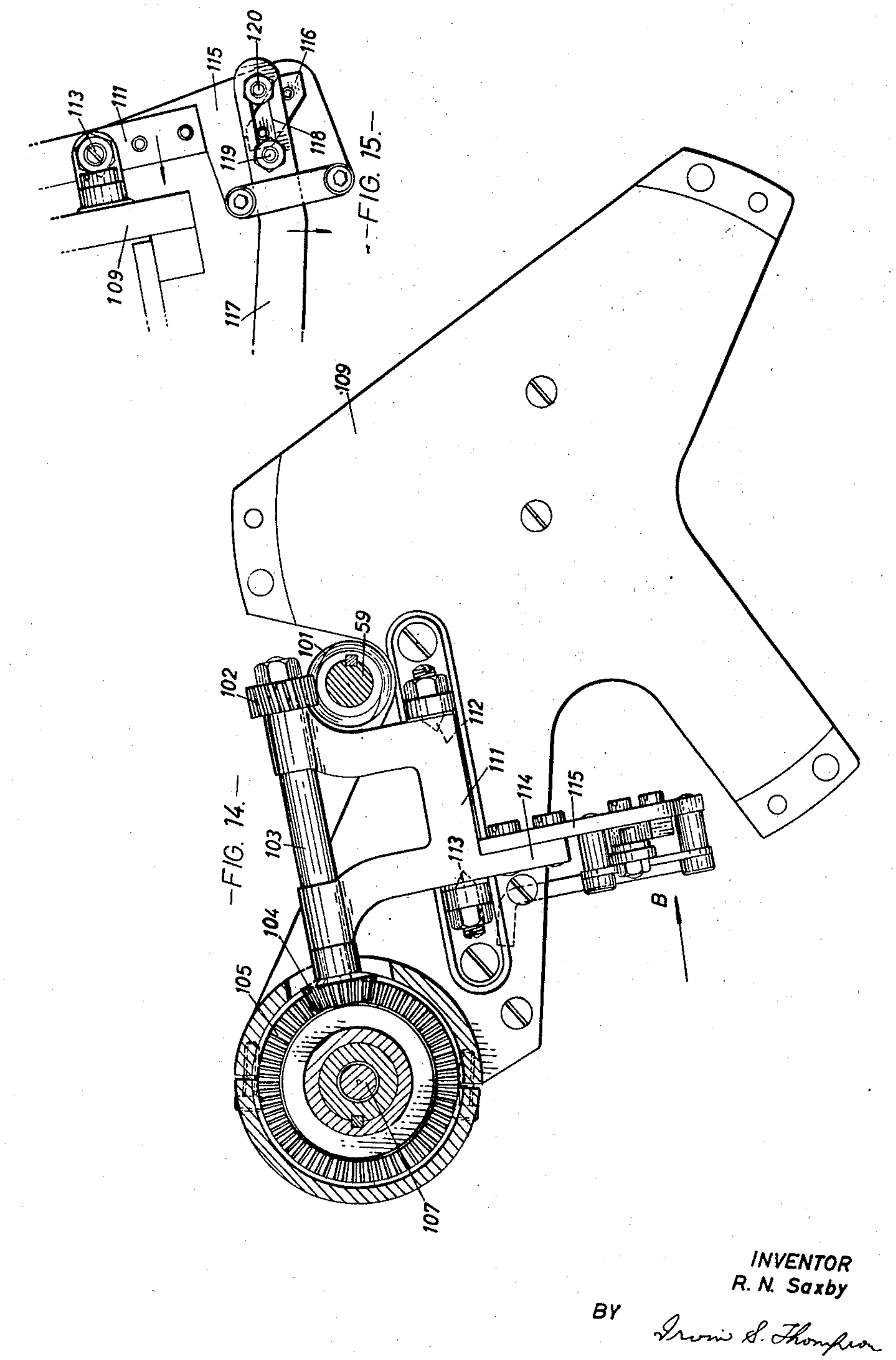
Figure 16:
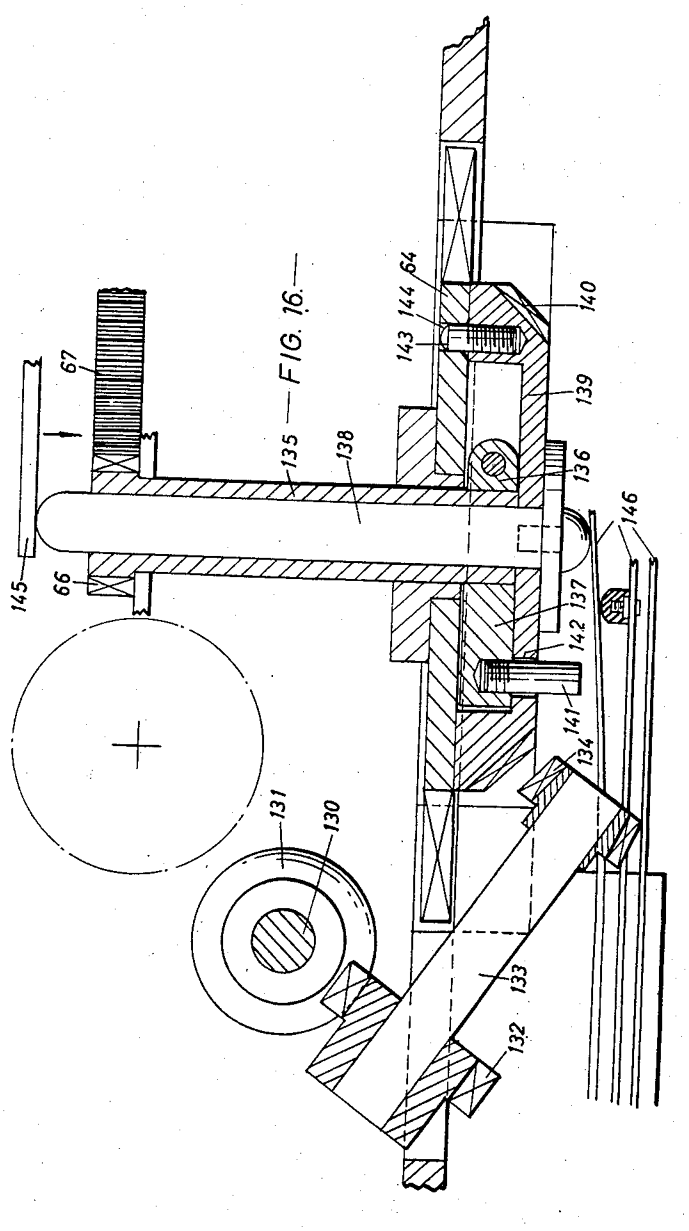
Figure 18:
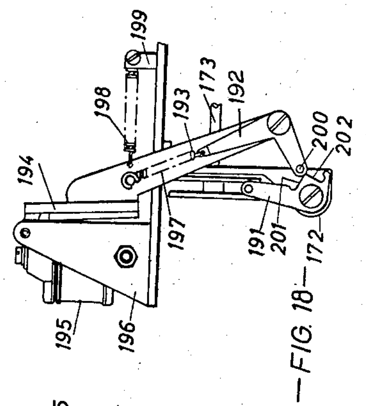
Figure 17:
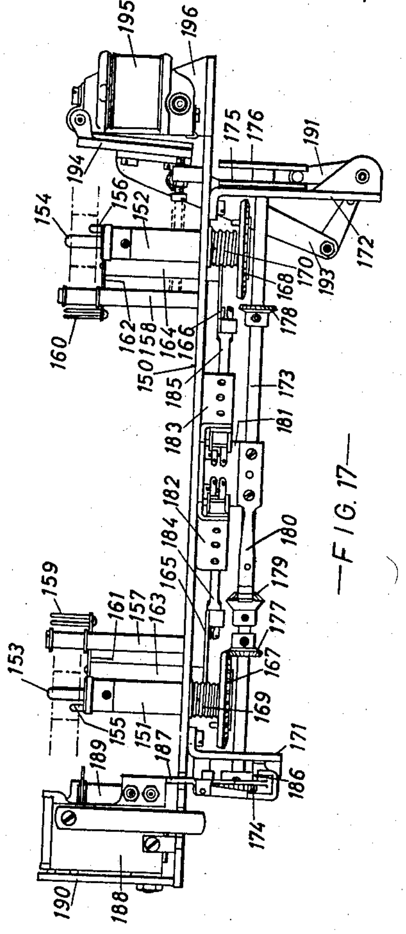

The invention will be better understood from the following description taken in conjunction with the accompanying drawings in which Fig. 1 shows a plan view of the type-printing mechanism with certain parts removed to enable the arrangement of the printing magnets to be seen, Fig. 2 shows a part-sectional side elevation of the mechanism, looking from the left-hand side of Fig. 1, Fig. 3 shows a manner of mounting a type arm, Fig. 4 shows a part sectional front elevation of the mechanism, Fig. 5 shows a front view of the platen roller, the paper magazine and the mounting arrangements therefor, Figs. 6 and 7 show diagrammatically the driving arrangements and the line feed arrangements, Fig. 8 shows a side elevation of the driving arrangements and the arrangements for controlling the line feed, Figs. 9 and 10 show the circuit arrangements for controlling the operation of the mechanism, Figs. 11 and 12 show the electromagnetically operated ribbon lift mechanism, Fig. 13 shows a part-sectional plan view of an alternative drive to the line feed mechanism, Fig. 14 shows a side elevation of the alternative drive in the direction of the arrow A in Fig. 13, Fig. 15 shows a detail of the operating mechanism for the alternative drive looking in the direction of the arrow B in Fig. 14, Fig. 16 shows a part-sectional view of an alternative carriage control mechanism, Fig. 17 shows a front elevation of an alternative ribbon advance and reverse mechanism, Fig. 18 shows an end elevation of the mechanism shown in Fig. 17 and Fig. 19 shows alternative circuit arrangements for controlling the operation of the type-printing mechanism.

It should be explained that the embodiments shown in the drawings consist of a typewriter embodying many features already well known in the art and employed in conjunction with apparatus adapted to operate in accordance with the principles of the present invention. Those parts of the typewriter which are well known and which are shown in the drawings will not, however, be referred to in the following description which will be concerned only with the portions of the mechanism which are different from known typewriters.

Referring now to Figs. 1, 2 and 3 and more particularly to Fig. 1, the typewriter is provided with the usual keyboard, the characters having been omitted from some of the keys shown in the drawing. The type arms, of which one is shown at 10, are operated to print the characters by electromagnets 11 which when energised attract their armatures, such as 12, the movement of the armatures being transmitted to the type bars through a mechanical linkage, which will be described in detail later. The electromagnets are arranged in a number of banks of which one only is shown in Figs. 1 and 2. Each bank of electromagnets is arcuately arranged in such a manner that the electromagnets in each bank are offset in relation to the electromagnets of the other banks to prevent fouling between the mechanical linkages of adjacent electromagnets. This is more clearly shown in Fig. 4 which is sectioned at four different levels, of which that at the left-hand side is the lowest, the electromagnet 11*a* being an electromagnet of the lowest level while electromagnets 11*b* are in the level above 11*a*. Other electromagnets of the lowest level have also been given the reference 11*a* in this figure. The yoke of each bank of electromagnets is a common iron casting 13 and, as shown in Fig. 4, each individual magnet has a core 14, and a winding 16. The armature 12 pivots on locating pins driven into the yoke and is maintained on the pivot pins, as shown in Fig. 4, by the spring 17.

The mechanical linkage between the armature of the electromagnet and the appropriate type bar consist of an arm 18 secured to the armature 12 of the electromagnet to the end of which arm is pivoted an operating rod 19. As best seen in Fig. 3 the operating rod terminates in a slotted head 20 which engages with the hook-like portion 21 of a member 22 to which the type bar 10 is secured. The slotted head is screwed on to the operating rod so that the length of the linkage may be adjusted. The member 22 is provided with a slot 23 which engages with a rod 24 mounted on a fixed portion 25 of the mechanism. A spring 26 has one end attached to the member 22 and the other end attached to a fixed portion of the apparatus so that the type bar, its associated linkage and the electromagnet armature is spring-biased to the position shown in Fig. 4. When an electromagnet is energised, the armature is attracted causing the associated operating rod to move to the left as shown in Figs. 2 and 3. This results in the rotation of the member 22 in a counter-clockwise direction thereby causing the type bar to engage sharply with the paper on the platen roller 27 to print the character. Owing to the speed of operation of the mechanism it will be appreciated that the type bar hits the roller with considerable force and it was found that using a type bar of usual construction soon resulted in distortion of the type bar to such an extent as to render it unusable. A special form of type arm was accordingly designed which as seen in Fig. 3 is tubular in shape. The armature stroke is adjusted so that about one half of the type arm movement is effected by the magnet while the remainder is completed by the momentum of the arm, the end of the operating rod sliding within the slot defined by the hook-like projection 21. The slotted head on the operating rod can be unhooked from the type arm when the latter is in its operated position. When the type arm is in its unoperated position the slot in the head of the operating rod abuts against the arcuate face 47 of the member 22 and prevents unhooking and also limits the stroke of the electromagnet armature.

The electromagnet shown in section in Fig. 2 serves to control the ribbon feed mechanism and for this purpose the armature is formed with a portion 28 extending at right-angles thereto. This portion is provided with a forked termination in which a pin 29 fixed to the arm 30 engages. The arm 30 is mounted on a shaft 31 which also carries a ratchet wheel 32. Pivoted to the end of the arm 30 is an operating pawl 33 which engages in the teeth of the ratchet wheel, the position of the pawl being adjustable by means of the screw 34. A retaining pawl 35 also engages with the ratchet wheel 32. It will thus be seen that the operation of the ribbon feed magnet, in a manner to be described subsequently, causes the ratchet wheel to make one step in the clockwise direction thus actuating the ribbon feed mechanism which is of conventional type and will not be described.

The ribbon lift mechanism may also be of conventional type but alternatively it may be controlled by one or more electromagnets, particularly if it is desired to print in two or more colours. A typical arrangement is shown in Figs. 11 and 12 where the ribbon lift mechanism 80 is shown as being controlled by three electromagnets 81, 82 and 83. Each electromagnet armature 84, 85 and 86 is provided with a pivot block 87, 88 and 89 and links 90 for individually controlling the ribbon lift mechanism, the arrangement being such that the lifts effected on the operation of armatures 84, 85 and 86 are respectively ⅓, ⅔ and 3/3 of the width of the ribbon thus enabling printing to be done in three colours.

The mechanism associated with the character keys is also shown in Fig. 2 and it should be explained that the depression of a character key causes the operation of two sets of contact springs referred to as the "X" and "Y" contacts. The arrangement is such that the "X" contacts are operated during approximately the first ⅛" of the movement of the character key while the "Y" contacts are arranged to operate during approximately the last ⅛" of the stroke, the total stroke being about ½." Each set of "X" contacts is individual to a key but the "Y" contacts, of which there is only one set, are common to all the character keys and are operated when any character key is depressed. The "X" contacts 36 are shown in both Figs. 2 and 4 while the "Y" contacts 37 are shown only in Fig. 4. As shown in Fig. 2, the character key 38 is secured to a bell crank lever 39 one arm of which is provided with a slot 42 engaging with a transverse rod 43, the key 38 being maintained in the unoperated condition by spring 40. The second arm 44 of the bell crank lever is provided with a spring operating member 45 which engages with a pin 46 secured to the moving spring of the combination forming the "X" contacts 36. The moving spring is tensioned so that it normally engages with the left-hand spring but with the bell crank lever 39 in the position shown, the moving spring is moved to engage with the right-hand spring. It will thus be seen that the depression of a key will cause "make," "break" or "changover" of the contacts according to the spring combination fitted. The arrangement of the "X" contacts some of which are changeover and some of which are make contacts is such that if two keys are depressed together only one prepares a circuit to a printing magnet so that two or more printing magnets cannot be operated simultaneously. As regards the "Y" contacts these consist of two springs only corresponding to the centre and left-hand springs of the "X" contacts and the arrangement is such that contact between the two springs is interrupted until one of the keys is depressed when it is made. The "Y" contacts are controlled by a bell crank lever having arms 48, 49 mounted on a shaft 15 which extends the width of the keyboard. The arm 49 is pivoted about the spindle 43 in a similar manner to the "X" contacts bell crank. The shaft 15 is normally positioned within a recess 41 in one arm of the "X" contacts bell crank and it will therefore be seen that the "Y" contacts are operated each time a character key is depressed. The purpose of the "X" and "Y" contacts will be explained in detail when the circuit diagram is described.

The mechanism is driven by a continuously operating electric motor indicated by M in Figs. 8 and 10. A chain or gear drive 50 (Figs. 6 and 8) from the motor is taken to a chain wheel or gear 51 fixedly mounted on the shaft 52 which therefore continuously rotates. The shaft 52 terminates at one end in a one revolution clutch 53 and at the other end in a half-revolution clutch 54. The clutch 53 is controlled by the magnet CM, the armature 55 (Fig. 7) of which carries an extension 56 which when the magnet is de-energised lies in the path of a projection 57 provided on the clutch 53 whereby the clutch 53 is ineffective in transmitting rotation from the shaft 52 to the shaft 58. Energisation of the magnet CM, in a manner to be described later, causes the armature extension 56 to be moved out of the path of the projection 57 and the shaft 52 is then clutched to the shaft 58. It will be understood that for the shaft to make a single revolution the magnet CM is operated for a period which is short compared with the time of one revolution of the clutch so that when one revolution has been completed the armature extension 56 is again in the path of the projection 57 and the two shafts are declutched until magnet CM is operated again. Alternatively, of course, magnet CM may have been operated again before one revolution has been completed in which case the first and second revolutions are continuous. During each revolution of the shaft 58, a series of operations takes place involving the printing of a character, carriage feed and ribbon feed.

The operation of the clutch 54 is similar to that of clutch 53 except that shaft 52 is clutched to shaft 59 for half a revolution on the energisation of magnet LM during which half revolution the magnet remains energised. On the release of magnet LM after the half revolution has been completed, a further half revolution of the shaft 59 takes place. The clutch 54 is provided with two projections arranged at diametrically opposite positions one of which projections is the same as projection 57 for the clutch 53 while the other is shaped so that it prevents operation of the clutch when the electromagnet armature is in its operated position and allows operation of the clutch when the armature is in its normal position thereby providing for the ½ revolution operation of the clutch. The effect of the first half revolution of shaft 59 is to return the carriage while the effect of the second half revolution is to advance the paper by one or more lines.

The drive to the carriage feed mechanism is taken from the shaft 58 through a gear 60 meshing with the worm 61. The shaft 62 on which the worm 61 is mounted carries an offset pin 63 which serves to drive a Geneva wheel 64 one step towards the end of each revolution of the worm 61. The Geneva wheel 64 is mounted on a spindle 65 which also carries a gear 66 which meshes with the rack 67 secured to the carriage mechanism. The rack 67 is pivotally mounted on a shaft 68 on the carriage mechanism as shown in Fig. 7, the rack being moved one step to the left for each revolution of the shaft 58 against the tension of a spring (shown at 70 in Fig. 8). When magnet LM is energised, the first half revolution of shaft 59 causes the pin 69 (Fig. 7) to move to the right whereupon the rack moves to the dotted position out of engagement with the worm 61. The tensioned spring is now effective on the rack to return it to its initial position. The spindle 65 on which the Geneva wheel is mounted also carries a cam (not shown) for controlling a conventional ribbon lift mechanism. The essential feature of this mechanism is that the carriage step-by-step movement is by positive drive from the motor and not by a spring drive through an escapement mechanism which is conventional practice. This feature above all else is the one which enables high printing speeds to be achieved.

The line feed mechanism, which has been referred to previously, is seen in Fig. 8 which also shows the motor M, the chain drive 50 to the chain wheel 51 and the spring 70 for effecting the return of the carriage. The platen roller which carries the paper on which printing takes place is shown at 27 while the paper magazine is shown at 71. The shaft 59, which is clutched to the main driving shaft 52 by the half revolution clutch 54 as previously described, carries a cam 72 which engages with a roller (not shown) mounted on the spindle 73 carried by the arm 74 which is pivoted at 75 to a fixed portion 76 of the mechanism and is urged in a counter-clockwise direction by the spring 77. This arm carries a pawl 78 adapted to actuate a ratchet wheel mounted coaxially with the platen roller 27. It will be noted that the rise of the cam is in two portions of which the first extends over the first 180 deg. and serves to advance the pawl 78 into engagement with a tooth on the ratchet wheel from which it is normally clear. This clearance is provided so that the platen can be rotated manually. The second portion extends over the second 180 deg. and advances the pawl and ratchet wheel by one or more teeth, according to the adjustment, to advance the paper. The ratchet wheel for effecting line feed is shown at 90 in Fig. 5. This ratchet wheel is mounted on the shaft 91 provided with a square head 92 which extends into the square section interior of the platen roller 27. The manual operating knob 93 is secured to the shaft 91 while the operating knob 94 is secured to the platen roller 27. Axial movement of the platen roller may thus take place without necessitating any axial movement of the ratchet wheel 90.

The various elements which have been described are made up into a number of sub-assemblies for ease of maintenance and overhaul. These sub-assemblies are as follows:

(1) The frame sides 100 (Fig. 2)
(2) The magnet yoke and core members 13 (Fig. 2)
(3) The type arm sub-assembly in the form of a quadrant
(4) The ribbon feed mechanism
(5) The key board, which may be located remotely from the printer
(6) The carriage support, shift mechanism, ribbon lifting mechanism and associated electromagnets, if provided
(7) The carriage
(8) The support plate for the clutch magnets and the spring combinations
(9) The contact bank and wiper sub-assembly.

The control of the printing functions is exercised by an electrical circuit, one form of which is shown in Figs. 9 and 10. It will be understood however that the circuit can be modified in accordance with the requirements of the external apparatus in conjunction with which the printer has to work.

As regards the bank of contacts, these may be arranged in rows or levels extending over the full traverse of the carriage. The contact levels are fixed to the carriage support while the carriage carries contact members or wipers which as the carriage moves cooperate successively with the contacts in the different levels. One or more wipers may be provided to cooperate with one level of contacts which may have twin contact tips.

The margin at each side of the paper roll can be adjusted in a manner similar to conventional typewriter practice and in addition the margin setting devices can be made to operate electrical contacts. Such contacts are indicated in the circuit by ON, which operate when the carriage makes its first step to the left from whichever position it has been set as normal, and by LS which operate when the carriage makes its last step to the left in whatever position it may be adjusted to do this. The extreme setting is such that the off normal step ON can also be the last step LS.

Describing now in detail the circuit shown in Figs. 9 and 10 the circuit embodies two main groupings, one for Manual printing and one for Automatic printing, changeover from one to the other being effected by operation of an Auto-Manual Key KMA. The circuit as shown is arranged to print the results of a test carried out by external apparatus and the "answer" consists of a sign (+ or −) and a number of digits, preceded by a space and is described by way of illustration only.

The circuit of the motor M may be controlled directly by a motor start switch MSS or by a motor control circuit MCC. In describing the operation of the circuit however, direct control of the motor will be assumed and a description of the operation of the motor control circuit will be given subsequently.

The automatic printing cycle is initiated by the external circuit performing its functions, the "characters" to be printed or "spaces" traversed being determined by cross connecting bank contacts to printing magnets or the space resistor R2. Upon completion of this function the nonlocking start key KS is operated so that contacts KS1/2 are closed for a short period.

The following circuit is now completed: earth, winding of relay C, resistor R1, test contacts T1/2, springs 2/3 of key KMA, wiper W1, bank contact 1 (level 1), springs 1/2 of key KS, resistor R2 to battery. If this circuit is "continuous," relay C operates and completes the following circuit: earth, KMA8/7, C2/3, CR6/5, LS2/1, CM2/1, winding of clutch magnet CM to battery. The clutch magnet CM operates and springs CM1–2 in opening connect the resistor R4 in series with the winding of the clutch magnet so reducing the current to the hold value. The cam shaft begins to rotate as previously described carrying with it cams T, I and R and the following operations now take place, A being the start of the shaft revolution.

B. Print impulse springs I1/2 close sending a current impulse to R2 and short-circuiting relay C which commences to release.

C. Springs T2/3 close connecting relay C via KMA4/5 to wiper W2. If there is a continuous circuit from wiper W2 to a printing magnet, relay C will hold. If there is no continuous circuit, relay C continues to release.

D. Springs T5/6 close connecting a spark quenching condenser C1 to impulse spring I1 (part of the function of this part of the circuit is to prevent false operation of relay C by discharge from capacitor C1).

E. Relay C releases if there is no continuous circuit.

F. Clutch magnet CM releases if relay C releases so preparing to stop the one revolution shaft at the end of one revolution.

G. Springs I1/2 open, after a "space" impulse.

H. The mechanical movement of the carriage begins.

I. Springs R1/2 close thereby completing the circuit for the ribbon feed magnet RM which energises and the ribbon is fed by about $\frac{1}{32}''$.

J. Springs T5/6 open disconnecting the spark quench circuit. Wipers W1 and W3, which are bridging wipers move off one bank contact to the next.

K. Springs T4/5 close, discharging the spark quench capacitor C1.

L. Springs T1/2 close, relay C holds (if the bank and external circuit continuity test made during operation C was positive) over the bank contact already tested for continuity to a 40 ohm printing magnet and relay A to battery.

N. Wiper W2 makes and breaks.

O. Springs R1/2 open so that the ribbon feed magnet RM releases.

A cycle is complete and the carriage stops moving. If relay C has not released, which means that the external circuit has prepared for printing a character, the cycle is repeated, printing a digit and so on for a second and third digit, printing and spacing occurring alternately. If relay C and clutch magnet CM have released, the printer stops. It will restart immediately a circuit is completed from the appropriate bank contact to a printing magnet. The object of this circuit is to ensure that the carriage will not make a step mechanically if there is a continuity fault in the external circuit. When wiper W1 reaches contact 6, the printer stops until completion of the next test by the external apparatus and reclosure of start contacts KS1/2. The start signal as described must be sufficient in duration to allow relay C and the clutch magnet CM to operate, and must be cut off before completion of printing the group of digits comprising the "answer" in order to avoid traversing a "space" in the position corresponding to contact 6 of level 1 of the bank.

One alternative start signal circuit is shown including alternative start key KSA and relay S in which the start signal can be of unlimited duration, so that after printing the group of digits comprising the "answer," the starting earth has to be removed and re-applied before the next group of digits will be printed. Where this circuit is used the start key KS and the earth connection to the right-hand winding of relay C are removed. The alternative start circuit operates in the following manner. When key KSA is operated, the following circuit is completed for relays C and S: earth, KSA1/2, KMA13/12, winding of relay C, resistor R1, R2/1, KMA2/3, wiper W1 on contact 1 of level 1, S2/3, winding of relay S to battery. Relays C and S operate, relay C performing the functions previously described. Relay S in operating at springs S2/3 opens its initial operating circuit and at springs S3/1 locks over resistor R3 to earth over KSA2/1 or C5/4. When the first group of digits has been printed, wiper W1 reaches contact 6 in level 1 and the circuit for relay C is opened since relay S is still operated. Relay C releases and at springs C4/5 removes one earth from the holding circuit of relay S. If the key KSA is still operated, however, relay S will still hold. On the eventual release of key KSA, relay S will release and printing of the next group of digits will take place when key KSA is again operated.

Relay A is protective in function. It will not operate or hold in series with C and R1 but will operate and release on the pulses of current through the printing magnets. Contacts A1–2 impulse a thermal relay which will not operate on impulses. If an earth fault develops which results in a continuous flow of current through a printing magnet which might cause a burnout, relay A remains operated and operates the thermal relay B which locks itself to earth over springs B3/2 and cuts off the earth to the remaining apparatus. Relay A thereupon releases but the thermal relay remains operated and is only released by disconnection of the battery supply when the fault has been cleared. All magnets and relay windings other than printing magnets are self-protecting.

For manual operation, the key KMA is moved to the manual position and the springs then take up the position shown in the drawing. Wipers W1 and W2 are thus disconnected and at springs KMA1/2 the printing contacts I1/2 are connected to the manual printing lead MPL. The printing magnet contacts PM0 to PM9, PMM, PMP and PMS are operated on the depression of the corresponding key and are the "X" contacts to which reference has already been made. In addition the depression of any key causes the operation of the common "Y" contacts PMY. As previously explained, the "X" contacts are arranged to be operated during the first $\frac{1}{8}''$ of the movement of the typewriter key while the "Y" contacts are arranged to operate over the last $\frac{1}{8}''$ of the stroke, the total stroke being about $\frac{1}{2}''$.

A print or space key is depressed and contacts "X" close on the first portion of the key stroke. Relay C operates if there is a continuous circuit via R1, T1/2, KMA1/2, print key, print magnet, relay A, battery. Contacts C2/3 prepare the circuit: batery, winding of CM, LS1/2, CR5/6, C3/2, KMA6/7 which is completed to earth over springs Y1/2 when the key is fully depressed and "Y" contact makes. Clutch magnet CM operates and the shaft begins to make one revolution. Relay C releases when springs T1/2 open and when released relay C also short-circuits itself via contacts "Y." Springs I1/2 impulse the appropriate magnet via the manual print impulse line MPL and printing occurs. The shaft moves the carriage and at the end of one revolution stops, the clutch magnet CM having been released by C2/3.

No further printing can occur until the key is released sufficiently to remove the short circuit on relay C at "Y" to permit C to reoperate on the depression of another key or a second depression of the same key.

If two keys are depressed simultaneously the series circuit through their contacts is such that only one can be effective in establishing a circuit for a printing magnet.

The carriage return movement is controlled by the contacts ON and LS which are mechanically operated by the carriage at positions which as described are adjustable to cater for different margins. With the carriage in its initial position, contacts ON are open and are closed when the carriage makes the step following the printing of the first character of a line. Contacts LS are operated on the step of the carriage following the printing of the last character of the line. Hence at this time both contacts LS and ON are closed and the following circuit is completed: earth, ON1/2, LS4/3, winding of clutch magnet LM to battery. Clutch magnet LM thus operates and clutches the shaft 52 to the shaft 59 for half a revolution to effect carriage return as previously described. It will also be noted that springs LS1 and 2 open in order to prevent inadvertent operation of the clutch magnet CM during carriage return and line feed due to wipers passing over bank contacts connected via the external circuit to the printing magnets. The cam CR is mounted on the shaft 59 and after about 45 deg. rotation of the shaft, cam CR operates the CR springs. At springs 3 and 4, the circuit for clutch magnet LM is maintained independently of springs LS3 and 4 which will open at the beginning of the carriage return movement. Also at springs CR5 and CR6 another point is opened in the circuit of the clutch magnet CM since springs LS1 and LS2 will also reclose at the beginning of the carriage return movement. When the carriage is returned to its normal position, springs ON1 and 2 open and the circuit of the clutch magnet LM is opened and the magnet releases. The release of the magnet LM causes the shaft 52 to be clutched to the shaft 59 for a further half revolution during which line feed is mechanically effected as previously described. It will also be noted that the CR contacts are restored to normal during the further half revolution of shaft 59.

The carriage is returned to normal manually by depressing key KCR. Magnet LM operates and the return function operates as described above for automatic working. If key KCR is operated momentarily the carriage returns and the paper is line fed. If key KCR is held down, the carriage returns but the paper is not line fed until the key is released. The paper can be line fed with the carriage in the normal position by operation and release of key KCR.

The carriage can be traversed rapidly to the left by operaing key KRT. If KRT is held down until the last step, the carriage will automatically return to normal and recommence traversing to the left.

If a printing key is held down and the key KRT depressed the character will be printed continuously along a line.

Reference has already been made to the motor control circuit which may be added to the circuit as desired. This control circuit includes a relay E which controls a contact arranged in series with the motor start switch MSS which is normally switched ON so that the relay has to be operated before the motor circuit is complete. As shown relay E responds to the operation of a key KSM in the external circuit but it will be understood that any starting means may be employed which applies an earth signal to the winding of relay E. In operation the motor start key KSM will be operated in the external circuit in parallel with the print start key KS or KSA whereupon an obvious circuit is completed for the right-hand winding of relay E from the springs SM4/3. Relay E in operating at springs E3/4 completes the circuit for the motor and at springs E1/2 prepares a circuit for its left-hand winding. The operation of the machine takes place as previously described on the operation of the start key during automatic operation. On the first step of the carriage, springs ON1/2 close thereby completing the circuit for the left-hand winding of relay E before the opening of the circuit over the right-hand winding of the relay which takes place when key KSM is opened. Relay E thus remains energised over its left-hand winding until the carriage is returned to normal after the first line is completed. Springs ON1/2 then open but at this time the circuit over the right-hand winding is completed from earth over CR1/2 and the relay remains operated continuously until the carriage release and line feed is complete. In the case of manual operation, relay E is operated continuously from earth at KMA1O/9. This motor control circuit is provided to cater for cases where the motor is driven from accumulators, as for instance in out of doors testing equipment in order to economise battery charge.

Bank level 2 is included by way of illustrating one application to a testing apparatus which provides an answer of a sign + or — and three digits. There are eleven separate tests, the answers appearing in one line of printing and some of which may or may not have to be made for different grades of product.

A row of eleven keys is provided in the external circuit, one for each test. Three of these keys KTA, KTB and KTC are shown. They are double throw keys locking in either direction.

When a key is normal the appropriate test has to be made, and upon receipt of the start signal the printer will record the answer as described previously.

When a test is not required to be made, the key is thrown to the left. When wiper W3 reaches the first contact in a group of contacts allocated to that particular test the rapid traverse function is brought into effect and the carriage steps past this group of contacts to the next group for which the test key is normal. This action is analogous to the tabulation stepping of a conventional typewriter. When the test or tests not required are the last in the line of tests, the key for the first unwanted circuit is thrown to the right. When the carriage reaches the position of the first contact of the unwanted group, the carriage alarm function operates and the carriage returns to normal. It will be noted that the windings of the three magnets CM, LM and RM and relay S each have a non-linear resistor, such as NLR1 for magnet CM, connected across them in order to provide spark quenching when their circuits are opened.

A description will now be given of an alternative embodiment of the invention which provides for high speed traverse of the carriage in both directions and high speed line feed also in both directions. Referring first to Fig. 13, the shaft 59 which corresponds to the similarly referenced shaft shown in Fig. 6, is driven on the energization of clutch magnet LM, by the motor M shown in Fig. 10. This shaft which is mounted in a fixed bearing sleeve 100 carries a worm wheel 101, engaging with the pinion 102. The pinion 102 is mounted on a spindle 103, the other end of which carries a bevel gear 104, which can engage with either of the crown wheels 105 or 106. The crown wheels are mounted on a spindle 107, which runs in the ball race 108 secured to the side plate 109 of the machine. The side plate 109 is shaped so as to form an enclosure 110 for containing the crown wheels and a further ball race 120 is provided in the outer wall of the enclosure to serve as an additional support for the spindle 107. The spindle 107 extends beyond the outer wall of the enclosure and terminates in a knob 93 which corresponds to the similarly referenced knob in Fig. 5. The spindle 107 is inserted into a hollow shaft 91 which again corresponds to the similarly referenced shaft in Fig. 5 and this shaft carries the platen roller of the mechanism.

The arrangement for shifting the bevel gear 104 into engagement with one or other of the crown wheels 105 or 106 is more clearly shown in Figs. 14 and 15 of the drawings. The spindle 103 which carries the pinion 102 of the bevel wheel 104 is mounted in a frame 111 which is held between the pivot points 112 and 113. An extension 114 of the frame is secured to a plate 115 to which is secured a guide member 116.

The armature of an electromagnet which is shown as RM in the circuit diagram of Fig. 19 is provided with an extension 117 having a slot 118 in which is secured two pins 119 and 120. As shown more particularly in Fig. 15 these pins engage with the surfaces of the guide member 116 in such a manner that when the magnet RM is operated and the armature moves in the direction of the arrow, the frame 111 will undergo clockwise rotation about the pivot points 112 and 113, thus causing the bevel gear 104 to disengage with the crown wheel 105 and engage with the crown wheel 106. It will thus be appreciated that the operation of the electromagnet RM will reverse the direction of rotation of the platen roller to enable vertical traverse to take place over the printing medium.

In the first embodiment, the drive from the motor to the shaft 59 was intermittent and was controlled by a magnet LM. The operation of the magnet LM served to operate a half revolution clutch which coupled the motor drive to the shaft 59 for half a revolution in order to effect line feed. In addition the release of the magnet LM coupled the motor drive to the shaft 59 for a further half a revolution to effect carriage return. In the present embodiment, carriage return is effected by other means to be described later and the magnet LM controls a one revolution clutch to drive the shaft 59 intermittently to provide single line feed for normal operation. Where vertical traverse over the printing medium is required, the magnet LM is maintained operated as will be described later in connection with Fig. 19, so that the shaft 59 is driven continuously until the required traverse has been effected.

Reference will now be made to the carriage control mechanism shown in Fig. 16 and in this connection it should be explained that in addition to the motor M already referred to, the mechanism is also provided with a motor M1 which is reversible. The method by which the motor is reversible will be described in more detail in connection with the circuit diagram of Fig. 19. This reversible motor drives a shaft 130 shown in Fig. 16 and it will thus be appreciated that this shaft may be rotated in both directions. The shaft carries a worm wheel 131 which engages with a pinion 132 carried by a spindle 133 which is provided at its other end with a bevel wheel 134. In the prior embodiment carriage advance was effected between the printing of two characters by the operation of a Geneva wheel which drove a pinion which was in engagement with a rack mounted on the carriage. Each step of the Geneva wheel therefore advanced the rack and hence the carriage a predetermined distance. The same method of advancing the carriage between characters is employed in the present embodiment and in Fig. 16 the Geneva wheel is given the same reference 64 as in Fig. 6. Similarly the pinion driven by the Geneva wheel and the rack are also given similar references, 66 and 67 respectively. However in this embodiment, additional arrangements are provided which enable the pinion 66 to drive the rack 67 for extended periods from the shaft 130 of the reversible motor. To enable this to be done, the pinion 66 is mounted on a sleeve 135 which is provided at the other end with a collar 136 having a lateral extension 137. A spindle 138 passes through the sleeve 135 and carries a member 139 provided with a bevel toothed ring 140 which can be made to engage with the bevel wheel 134. A pin 141 secured to the lateral extension 137 of the collar 136 passes through an aperture 142 in the member 139 while a further pin 143 secured to the member 139 enters an aperture 144 in the Geneva wheel 64. With the parts in the position shown in the drawing, therefore the movement of the Geneva wheel is transmitted by means of the pin 143 to the member 139 and from the member 139 by means of the pin 141 and the extension 137 of the collar 136 to the sleeve 135 and hence to the pinion 66.

When rapid traverse of the carriage mechanism is required a magnet SM is energised in a manner to be explained in more detail in connection with Fig. 19. The armature of this magnet carries an extension 145 which is normally in contact with the spindle 138. When the magnet is energised, the armature moves in the direction indicated by the arrow so that the spindle 138 moves downwardly as seen in Fig. 16 and carries the member 139 with it. The extent of this movement is sufficient to withdraw the pin 143 from the aperture 144 in the Geneva wheel 64 but is insufficient to disengage the pin 141 from the aperture 142. Also this movement of the spindle 138 causes engagement between the bevel gear 134 and the toothed ring 140 on the member 139. Therefore, the effect of the operation of the carriage magnet SM is to disconnect the driving connection between the Geneva wheel 64 and the pinion 66 and to complete the driving connection between the shaft 130 driven by the reversible motor and the pinion 66. At the same time, the downward movement of the spindle 138 causes the operation of the contact spring set 146 the effect of which is to close the circuit of the D.C. motor M1 so that the drive to the carriage mechanism by the reversible motor only starts after engagement of the bevel pinion 134 and gear 140.

A description will now be given of the ribbon advance and return mechanism shown in Figs. 17 and 18. This mechanism is secured to a plate 150 which is fixed relative to the complete mechanism. Mounted on the plate 150 are two pillars 151 and 152 through which pass the rotatable spindles 153 and 154 respectively on which the spools carrying the ink ribbon are mounted, the spools being indicated by dotted lines. Two pins 155 and 156 engage with corresponding holes in the spools in order to transmit the drive from the spindles 153, 154 to the two spools. Guide posts 157 and 158 are provided for the ink ribbon and the ribbon also passes through two eyelets 159 and 160 which are mounted on arms 161, 162 secured to spindles 163, 164 which pass through the plate 150 and terminate in operating levers 165, 166. The spindles 153, 154 pass through the plate 150 and terminate in crown wheels 167, 168. The crown wheels 167, 168 are arranged to float with respect to pillars 151, 152 by the provision of springs 169, 170 provided between the crown wheels and the under side of the plate 150.

Mounted on the underside of the plate are also two brackets 171, 172 and these form bearings for a shaft 173. The left-hand end of the shaft 173 carries a ratchet wheel 174 while the right-hand end of the shaft is provided with a coupling member consisting of two spaced discs 175, 176. Also mounted on the shaft are two bevel pinions 177, 178, the former normally engaging with the crown wheel 167, while the latter is capable of engaging with the crown wheel 168 upon axial movement of the shaft 173 towards the right.

The shaft 173 also carries a latching member 179 comprising two oppositely-directed truncated cones. This latching member co-operates with a spring 180 secured to a bracket 181 which is formed integrally with two further brackets 182, 183, the unitary structure being secured to the underside of the plate 150. The brackets 182, 183 carry contact springs 184, 185 which are operated by the operating levers 165, 166 respectively. The ratchet wheel 174 is operated by a pawl 186 which is carried by an extension 187 of the armature 188 to an electromagnet 189, the electromagnet being secured to a plate 190 fixed to the upper surface of the plate 150. Each time the electromagnet 189 is energised the armature is attracted and the pawl 186 rotates the shaft 173 in a clockwise direction looking from the right hand side of Fig. 17.

The coupling member comprising the discs 175, 176 is controlled by an arm 191 pivotally mounted on the bracket 172. This arm is operated by a bell crank lever 192 pivotally mounted to an extension 193 of the armature 194 of the electromagnet 195.. The electromagnet 195 is secured to a bracket 196 also mounted on the upper surface of the plate 150. The bell crank lever 192 is maintained in its mid position of a spring 197 secured to the armature extension 193 and the armature itself is biased to the released position by the spring 198 secured to the post 199 which in turn is mounted on the upper surface of the plate 150. The end of the bell crank lever which engages with the operating arm 191 is provided with a pin 200 which, when the electromagnet 195 is operated, can ride either down the surface 201 on the operating arm 191 or down the surface 202 depending upon circumstances, as will be described in more detail later.

The mechanism operates in the following manner. Each time a character is printed, the electromagnet 189 is energised in a manner which will be described with reference to the circuit diagram shown in Fig. 19 and attracts its armature 188 thereby causing the pawl 186 to advance the ratchet wheel 174 by one step. This causes rotation of the shaft 173 in a clocwise direction looking from the right hand side of Fig. 17 and this rotation is transmitted through the bevel pinion 177 and the crown wheel 167 to the spindle 153. Assuming that the spool mounted on the spindle 154 is full, the rotation of the spindle 153 advances the ribbon by winding a predetermined length on to the spool carried by the spindle 153. This operation continues until the spool carried by the spindle 154 is almost completely unwound. An eyelet on the ribbon now engages with the fork 160 and causes rotation of the spindle 164 to cause contacts 185 to make. As will be described with reference to Fig. 19 the making of these contacts causes energisation of the electromagnet 195. The aramture 194 is attracted causing the armture extension 193 to move in a clockwise direction as seen in Fig. 18. A corresponding movement is therefore made by the bell crank lever 192 and the pin 200 in this case rides down the surface 201 to engage with the operating arm 191 which through the coupling member causes the shaft 173 to move to the left as seen in Fig. 18 or to the right as seen in Fig. 17. This movement disengages the bevel pinion 177 from the crown wheel 167 and also causes the bevel pinion 178 to engage with the crown wheel 168 thereby driving the ribbon spool mounted on the spindle 154 in a direction to rewind the ink ribbon thereon. The shaft 173 is held latched in its right-hand position as seen in Fig. 17 due to the V-spring 180 riding over the latching member 179. The electromagnet 195 is de-energised as soon as the ribbon has been moved sufficiently in the reverse direction for the eyelet to be removed from the fork 160. When this occurs the contacts 185 are opened and the magnet 195 is de-energised. Consequently the pin 200 on the bell crank lever 192 now rides up the surface 201 but it will be understood that since the shaft 173 is latched in its left-hand position as shown in Fig. 18 the pin 200 in its return movement will ride off the surface 201 on the surface 202.

When the ink ribbon has been rewound a further eyelet thereon engages with the fork 159 thereby making the contacts 184 in a similar manner to the making of contacts 185 by engagement of the first eyelet with the fork 160. Contacts 184 and 185 are electrically connected in parallel as will be described later with reference to Fig. 19 so that the closure of contacts 184 will again cause energisation of the electromagnet 195. However when the electromagnet operates at this time, the pin 200 on the bell crank lever 192 will ride down the surface 202 and will rotate the operating member 191 in a clockwise direction as seen in Fig. 18. The shaft 173 is therefore urged towards the right by the operating member 191 operating against the latching member 179 and the spring 180. The force exerted by the operating member 191 is greater than that due to the latching device and the shaft 173 is therefore returned to its original position, so that the bevel gear 178 is disengaged from the crown wheel 168 and the bevel pinion 177 re-engages with the crown wheel 167.

It should be explained that the floating mounting of the two crown wheels 167 and 168 prevent damage to these wheels or to the bevel pinions 177, 178 which might arise due to misalignment of the teeth at the moment of engagement between these two pinions and crown wheels.

A description will now be given of the circuit diagram shown in Fig. 19 and it should be explained that a number of elements shown in the circuit correspond to those shown in Figs. 9 and 10. For instance, three printing magnets 0, 1 and X are shown together with their manually operated contacts PM0, PM1 and PMX. It will be understood that these three magnets are shown only for illustration and that normally a much larger number of magnets would be employed. The cams I, T and R are also provided, but as far as cam T is concerned, the operation is slightly different.

The clutch magnet CM corresponds to the clutch magnet CM of the first embodiment and similarly for magnet LM. Additional magnets are however employed in the present embodiment of which magnet RFM, which corresponds to magnet 189 of Fig. 17, controls the ribbon feed and performs a similar function to magnet RM of the first embodiment. Magnet RRM is the ribbon return magnet and corresponds to magnet 195 of Fig. 17, the contacts RE1 and RE2 corresponding to contacts 184 and 185. Magnets REM and BLM enable printing in two colours to be effected. Magnet RM is concerned with line feed and magnet SM is concerned with control of the carriage movement. Motor M is the primary driving motor for the mechanism which runs continuously and is controlled by the motor start contacts MSS. In addition to the motor M a reversible motor M1 is also provided to control the movement of the carriage as described previously.

The circuit arrangements are such that the mechanism may be controlled manually by the operation of keys on the keyboard or it may be controlled entirely automatically by signals from control equipment which may be, for instance, a computing mechanism. The circuit in the condition shown is arranged for manual operation and the change from manual to automatic operation is performed by operating the key switch KMA which causes relay AM to operate. Relay AM at contacts AM4 disconnects the control keys KSLA, KLU, KLD, KCR and KCL to enable automatic operation to take place.

The description will now be given of the operation of the circuit under manual conditions. When any one of the printing keys such as 0, 1 or X is operated, contacts KY are also mechanically operated in the manner previously described. As a result of the operation of contacts KY, relay C is operated and also the magnet CM over contacts C1, AM2, LS1 and the winding of the magnet. Relay C which is a slow-to-operate relay in operating opens the circuit to magnet CM which is therefore only operated for a short period.

Magnet CM in operating causes the shaft carrying the cams I, R and T to be rotated by one revolution by operating a one-revolution clutch as described in the first embodiment. The rotation of this shaft also causes the carriage to be advanced by the operation of the Geneva wheel 64 (Fig. 16) in the manner previously described. As regards the rotation of the cams, cam I causes the appropriate printing magnet to be energised depending on the printing key which has been operated while cam R causes the energisation of the ribbon feed magnet RFM which corresponds to the magnet 188 shown in Fig. 17. Cam T performs no useful function at this time.

The line advance mechanism is controlled by the clutch magnet LM, as in the first embodiment, the energisation of the magnet LM serving to couple the main motor drive to the shaft 59 shown in Fig. 13. In the first embodiment the energisation of magnet LM was effected automatically under control of carriage contacts ON and LS but in the present case keys KSLA, KLU and KLD are provided for this purpose. The key KSLA when operated serves to effect a single line advance while keys KLU and KLD when operated serve to effect movement of the printing medium up or down respectively continuously for as long as the appropriate key is depressed, that is to say key KLU is the "line up" key while key KLD is the "line down" key. The operation of the magnet LM serves to release a one-revolution clutch so that the shaft 59 (Fig. 13) makes one revolution to advance the printing medium by one line. Referring to the circuit diagram, the operation of key KSLA closes the circuit: earth, contacts AM4, contacts of key KSLA, winding of relay LA to battery and also over contacts LA1, winding of magnet LM to battery. Relay LA and magnet LM both operate in this circuit and relay LA in operating at contacts LA1 opens the circuit of the magnet LM. The magnet LM is thus operated only for a short period but the timing of the operation of relay LA is such that the duration of the operation of magnet LM is sufficient to enable the one-revolution clutch to be released to effect a single line advance. It is to be noted that relay LA remains operated as long as the key KSLA is depressed and hence it is not possible for the magnet LM to be again operated until the key KSLA has been released for a sufficient period to enable relay LA to release.

The operation of keys KLU and KLD has a different effect. Considering the operation of key KLU, the following circuit will be closed: earth, contacts AM4, contacts of key KLU, contacts SL1, winding of magnet LM to battery. The magnet LM operates in this circuit and remains operated as long as the key is depressed. Hence the one-revolution clutch is continuously effective and the printing medium is advanced line by line as long as the key is depressed. The purpose of contacts SL1 will be explained later. As regards the operation of key KLD, this causes the operation of relay LB which at contacts LB1 completes an obvious circuit for magnet RM. The armature of this magnet as previously explained with reference to Fig. 15 is provided with an extension 117 and the operation of the magnet reverses the drive between the shaft 59 and the shaft 91 thereby reversing the direction of rotation of the platen roller. The operation of magnet RM also at contacts RM1 completes a circuit for the magnet LM with the results previously described. Here again the magnet LM is maintained operated for as long as the key KLD is depressed.

The movement of the carriage mechanism is effected by the magnet SM, the armature of which as previously mentioned is provided with an extension 145 as described with reference to Fig. 16. The operation of magnet SM couples the drive from the reversible motor M1 to the pinion 66 to effect continuous carriage movement. Referring to Fig. 19, it should be explained that contacts ON1 are open when the carriage is in its extreme right-hand position i.e. when printing is about to take place on a new line, and the contacts are closed as soon as the carriage makes one step to the left in preparation for the printing of the second character on the line.

The operation of magnet SM is controlled by two keys KCR and KCL, the operation of the first serving to cause carriage movement towards the right while the second causes carriage movement towards the left. Thus the operation of key KCR at a time when contacts ON1 are closed causes earth at contacts AM4 to be applied to the winding of magnet SM over contacts ST1. Magnet SM operates and at contacts SM1 energizes the reversible motor M1 and also couples the drive from this motor to the pinion 66 (Fig. 16) as previously described. It will be understood that magnet SM remains energized and the carriage moves to the right for as long as the key KCR is operated.

The operation of key KCL completes an obvious circuit for relay R which at contacts R1 and R2 reverses the connections to the field coil FC of the reversible motor M1 and at contacts R3 completes an obvious circuit for the magnet SM over contacts LS2. Contacts LS2 and LS1 which will be referred to later are only opened on the step of the carriage mechanism following the printing of the last character of a line. Magnet SM in operating performs the same function as before but this time owing to the reversal of the connections to the field coil, the motor M1 rotates in the opposite direction so that the carriage moves to the left instead of to the right.

If the printer is to be operated automatically from control equipment such as a computer, the locking key KMA is operated to cause the operation of relay AM. At contacts AM4, relay AM removes earth from the springs of the five keys KSLA, KLU, KLD, KCR, KCL, at contacts AM2, it disconnects relay C and key KY and at contacts AM3, it disconnects the contacts controlled by cam I from the printing keys and connects them in parallel to the terminals T2.

The terminals T1 and T2 are connected to the external control equipment, for instance, a computer and connections are effected between corresponding ones of the two sets of terminals by the external control equipment to cause the successive operation of the printing magnets in accordance with the information stored in the control equipment.

The operation of the printer is now effected by potentials connected to the leads 210—219 and also by markings applied to contacts of the circular bank CB and the straight bank SB. The circular bank CB is mounted with its axis parallel to the shaft 91 carrying the platen roller and is stationary. The wiper W2 is geared to rotate with the shaft 91 and in its rotation to wipe over the contacts of the circular bank. The straight bank SB is stationary and is arranged so that the contacts extend in a direction parallel to the direction of movement of the carriage. The wiper W1 is mounted on the carriage and as the latter moves the wiper wipes over the contacts of the bank SB. The wiper W1 is connected to a high speed relay ST while the wiper W2 is connected to a high speed relay SL.

The operation of the printer under automatic control can best be understood by following an arbitrary printing sequence. Assume, for example, that the carriage is in its extreme right-hand position, that is to say in a position to print the first character on a line. The printing of the character will be effected by completing a connection between a contact of the set T1 and a corresponding contact of the set T2 and by applying earth potential to lead 210. Magnet CM is then energised over contacts AM2 and LS1 whereby the cams T, I and R make one revolution and the appropriate printing magnet is operated to print a character and the carriage is advanced by one step in the manner described for manual operation. A similar operation will then take place for further characters and it will be assumed that after three characters have been printed, the next character is to be printed in a different position on the printing medium. Earth potential will then be applied to lead 212 or 213 and also either to lead 214 or 215 depending on the coordinates of the position in which the next character is to be printed. At the same time, earth potential will also be connected to the appropriate contact of the bank SB and to the appropriate contact of the circular bank CB in order to control the extent of the vertical or horizontal traverse. The horizontal and vertical movements may take place coincidentally or successively and the extent of the movement will be determined by the marking on the two banks.

Thus when the carriage reaches the appropriate position, relay ST will operate and at contacts ST1 will disconnect earth from the winding of magnet SM and will connect it instead to lead 217 which extends to the control equipment thereby indicating that the horizontal traverse is completed and that the controlling earth may be removed from lead 214 or 215 as the case may be and also from the straight bank SB. Similarly, as regards the vertical traverse, the operation of relay SL when wiper W2 reaches the marked contact, disconnects earth from magnet LM and connects it instead to lead 216 thereby giving an indication in the control equipment that the vertical traverse has been completed, whereupon earth is removed from lead 212 or 213 as the case may be and also from the circular bank CB. It will be appreciated that the removal of earth from the circular bank and from the straight bank should take place subsequent to the removal of earth from the leads 212 to 215 in order to prevent re-operation of the magnets SM and LM. It will also be noted that provision is made for controlling single line advance from the control equipment by the connection of lead 211, which, when earth is connected thereto, enables relay LS to operate with results as previously described.

The colour control magnets REM and BEM are energised during manual operation by the operation of contacts CM1 of magnet CM. Switch MSW is a manually operated switch for selecting one of the two available ribbons, the appropriate magnet being energised following the energisation of magnet CM. The energisation of one of the colour magnets causes the approprate colour ribbon to be inserted between the printing medium and the type arm. When the operation of the printer is controlled from the control equipment, the operation of these magnets is effected by potential applied to lead 218 or 219.

The operation of relay A and the thermal relay B is the same as that described in the first embodiment, the function of these relays being protective in character.

I claim:

1. In a type-printing mechanism, a plurality of type bars for printing characters, a plurality of electromagnets for actuating said type bars, one electromagnet being provided for each of said type bars, an individual energising circuit for each of said electromagnets, ribbon feed mechanism, a further electromagnet for actuating said ribbon feed mechanism, a further energising circuit for said further electromagnet, a continuously-operating electric motor, a shaft, clutch mechanism for coupling said motor to said shaft to rotate said shaft through a predetermined angle, first and second cams mounted on said shaft, first electrical contacts controlled to close by said first cam during rotation of said shaft, said electrical contacts being connected in a circuit common to all said individual energising circuits, means for closing a point in each of said individual energising circuits whereby the operation of one of said last-mentioned means and the closure of said first electrical contacts completes the energising circuit for one of said electromagnets for said type bars and second electrical contacts controlled during the rotation of said shaft to close said further energising circuit for said further electromagnet and thereby actuate said ribbon feed mechanism.

2. In a type-printing mechanism, a plurality of type bars for printing characters, a plurality of electromagnets for actuating said type bars, one electromagnet being provided for each of said type bars, an individual energising circuit for each of said electromagnets, a movable carriage, a rack secured to said movable carriage, a driving pinion engaging with said rack, a continuously-operating electric motor, a shaft, clutch mechanism for coupling said motor to said shaft to rotate said shaft through a predetermined angle, a cam mounted on said shaft, electrical contacts controlled to close by said cam during the rotation of said shaft, said electrical contacts being connected in a circuit common to all the individual energising circuits, means for closing a point in each individual energising circuit of said electromagnets whereby the operation of one of said last-mentioned means and the closure of said electrical contacts completes the energising circuit for one of said electromagnets and intermittent gear means coupling said shaft to said driving pinion whereby rotation of said shaft causes said carriage to be advanced by one step.

3. A type-printing mechanism as claimed in claim 2 and comprising in addition a spring connected to be stressed during the advance of said carriage and means for disengaging said driving pinion from said rack to enable the return of the carriage under the control of the stressed spring.

4. In a type-printing mechanism, a movable carriage, carriage control mechanism, line feed mechanism, a continuously operating electric motor, a shaft, clutch mechanism for coupling said motor to said shaft to rotate said shaft in two steps each of a predetermined extent, means responsive to the rotation of said shaft through the first step for actuating said carriage control mechanism to effect return of said carriage and means responsive to the rotation of said shaft through the second step for actuating said line feed mechanism.

5. In a type-printing mechanism, a plurality of type bars for printing characters, means for selecting one of said type bars for operation, a movable carriage, carriage return mechanism, line feed mechanism, a continuously-operating electric motor, a first shaft, a first clutch mechanism for coupling said electric motor to said first shaft to rotate said first shaft through a predetermined angle, a second shaft, a second clutch mechanism for coupling said electrical motor to said second shaft to rotate said second shaft in two steps each of a predetermined angle, means responsive to the rotation of said first shaft to control the printing of a character by the selected type bar, means responsive to the rotation of said second shaft through the first step for actuating said carriage return mechanism and means responsive to the rotation of said second shaft through the second step for actuating said line feed mechanism.

6. A type-printing mechanism as claimed in claim 5 and comprising in addition a first clutch magnet for controlling said first clutch mechanism, a second clutch magnet for controlling said second clutch mechanism, means responsive to the energisation of said first clutch magnet for rotating said first shaft, means responsive to the rotation of said first shaft for advancing said movable carriage by one step, first electrical contact means operated by said movable carriage when advanced to the end of a line, a cam mounted on said first shaft, second electrical contacts controlled by said cam and an energising circuit for said second clutch magnet including said first and second electrical contacts.

7. In a type-printing mechanism, a movable carriage, a rack secured to said movable carriage, a driving pinion engaging with said rack, a continuously-operating electric motor, a first shaft, a first clutch mechanism for coupling said motor to said first shaft to rotate said first shaft by a predetermined extent, gear means including a Geneva cross coupling said first shaft to said driving pinion whereby rotation of said first shaft causes said carriage to be advanced by one step, a reversible electric motor, a second shaft driven by said reversible electric motor, a second clutch mechanism and means for operating said second clutch mechanism to disconnect said gear means and to connect said second shaft to said driving pinion.

8. In a type-printing mechanism, line feed mechanism, a continuously-operating electric motor, a first shaft, a first electromagnet, clutch mechanism responsive to the impulsive energisation of said first electromagnet for coupling said motor to said first shaft to rotate said first shaft by a predetermined extent and responsive to the continuous energisation of said first electromagnet for coupling said motor to said first shaft to rotate said first shaft continuously, a second shaft for controlling said line feed mechanism, reversing gear means interconnecting said first and second shafts and a second electromagnet for controlling said reversing gear means whereby the line feed mechanism is moved forwardly one step in response to the impulsive energisation of said first electromagnet, is moved forwardly continuously in response to the continuous energisation of said first electromagnet and is moved backwardly continuously in response to the continuous energisation of said first and second electromagnets.

References Cited in the file of this patent

UNITED STATES PATENTS

| | | |
|---|---|---|
| 482,015 | Lillard et al. | Sept. 6, 1892 |
| 710,264 | Gibbs | Sept. 30, 1902 |
| 938,354 | Tompkins | Oct. 26, 1909 |
| 970,295 | Beard | Sept. 13, 1910 |
| 1,023,806 | Bridgwater | Apr. 23, 1912 |
| 1,324,751 | Smith | Dec. 9, 1919 |
| 1,485,765 | Crawley | Mar. 4, 1924 |
| 1,517,843 | Lake | Dec. 2, 1924 |
| 1,781,725 | Handley | Nov. 18, 1930 |
| 1,800,399 | Page | Apr. 14, 1931 |
| 2,403,006 | Lake et al. | July 2, 1946 |